(12) United States Patent
Xu et al.

(10) Patent No.: US 12,133,784 B2
(45) Date of Patent: Nov. 5, 2024

(54) SYSTEM AND METHOD FOR MOUNTING ATTACHMENTS ONTO SHELL-SHAPED DENTAL APPLIANCES

(71) Applicant: WUXI EA MEDICAL INSTRUMENTS TECHNOLOGIES LIMITED, Wuxi (CN)

(72) Inventors: Xiyang Xu, Shanghai (CN); Lei Huang, Shanghai (CN); Xiaohui Liang, Shanghai (CN)

(73) Assignee: Wuxi EA Medical Instruments Technology Limited, Wuxi (CN)

( * ) Notice: Subject to any disclaimer, the term of this patent is extended or adjusted under 35 U.S.C. 154(b) by 528 days.

(21) Appl. No.: 17/298,933

(22) PCT Filed: Oct. 17, 2019

(86) PCT No.: PCT/CN2019/111679
§ 371 (c)(1),
(2) Date: Jun. 1, 2021

(87) PCT Pub. No.: WO2020/134387
PCT Pub. Date: Jul. 2, 2020

(65) Prior Publication Data
US 2022/0008167 A1    Jan. 13, 2022

(30) Foreign Application Priority Data
Dec. 26, 2018  (CN) .......................... 201811606285.8

(51) Int. Cl.
*A61C 7/08*  (2006.01)

(52) U.S. Cl.
CPC ..................................... *A61C 7/08* (2013.01)

(58) Field of Classification Search
CPC .... A61C 7/08; A61C 7/12; A61C 7/14; A61C 7/146
See application file for complete search history.

(56) References Cited

U.S. PATENT DOCUMENTS

2003/0198912 A1    10/2003  Mah
2003/0224310 A1*   12/2003  Andreiko ............... A61C 7/146
                                                           433/3

(Continued)

FOREIGN PATENT DOCUMENTS

CN        201370637 Y      12/2009
CN        201968851 U       9/2011

(Continued)

OTHER PUBLICATIONS

Tin-Free Angel Medical Devices Technology Co., Ltd., Shell Dental Instrument Attachment Mounting System and Method, Chinese First Office Action, Feb. 8, 2022, Application No. 201811606285.8.

(Continued)

*Primary Examiner* — Jamel M Nelson
(74) *Attorney, Agent, or Firm* — GREENBERG TRAURIG, LLP (57) ABSTRACT

In one aspect of the present application, there is provided a shell-shaped dental appliance attachment mounting method, comprising: a control device obtaining mounting information; and the control device using the mounting information to control an apparatus to mount and fix an attachment onto an shell-shaped dental appliance.

10 Claims, 5 Drawing Sheets

(56) References Cited

U.S. PATENT DOCUMENTS

| | | |
|---|---|---|
| 2017/0007359 A1 | 1/2017 | Kopelman et al. |
| 2018/0333224 A1 | 11/2018 | Van Esbroeck et al. |
| 2020/0121420 A1* | 4/2020 | Scurtescu ................ A61C 7/08 |

FOREIGN PATENT DOCUMENTS

| | | | | |
|---|---|---|---|---|
| CN | 104068939 A | | 10/2014 | |
| CN | 104083224 A | * | 10/2014 | ........... A61C 19/003 |
| CN | 104739527 A | | 7/2015 | |
| CN | 105496573 A | | 4/2016 | |
| CN | 205433947 U | | 8/2016 | |
| CN | 106541574 A | | 3/2017 | |
| CN | 107106261 A | | 8/2017 | |
| CN | 107212937 A | | 9/2017 | |
| CN | 108464870 A | | 8/2018 | |
| CN | 105496573 B | * | 9/2019 | |

OTHER PUBLICATIONS

Tin-Free Angel Medical Devices Technology Co., Ltd., Shell Dental Instrument Attachment Mounting System and Method, Chinese Second Office Action, Jun. 29, 2022, Application No. 201811606285.8.

* cited by examiner

SYSTEM AND METHOD FOR MOUNTING ATTACHMENTS ONTO SHELL-SHAPED DENTAL APPLIANCES

RELATED APPLICATIONS

The present application is a national phase filing under 35 USC 371 of International Application No. PCT/CN2019/111679, filed on Oct. 17, 2019, which claims priority to Chinese Patent Application No. 201811606285.8, filed Dec. 26, 2018, the entire contents and disclosures of which are hereby incorporated by reference.

FIELD OF THE APPLICATION

The present application generally relates to system and method for mounting attachments onto shell-shaped dental appliances.

BACKGROUND

Shell-shaped dental appliances such as invisible tooth repositioners and retainers made of polymer materials become more and more popular due to their advantages on cosmetic appearance, convenience of use and hygiene.

In orthodontic or orthognathic treatments using shell-shaped dental appliances, functional attachments are sometimes used to enhance treatment results. Commonly used functional attachments include button (for coupling a traction member so that a traction force will be applied on a corresponding part), twin block (for transferring a suitable occlusal force to lower jaw through an occlusal slope located in posterior teeth area), bite stop and occlusal pad, etc.

If a functional attachment is formed on a shell-shaped dental appliance by thermoplastic forming technique, on one hand, the functional attachment is prone to damage in some cases, and on the other hand, it might bring uncertainty for the performance of the shell-shaped dental appliance. If the functional attachment is fabricated separately and then manually mounted onto the shell-shaped dental appliance, the efficiency, precision (including position and angle) and quality (e.g., bonding firmness) cannot be ensured.

In view of the above, it is necessary to provide a novel system and method for mounting attachments on shell-shaped dental appliances.

SUMMARY

In one aspect, the present application provides a method for mounting an attachment on a shell-shaped dental appliance, which comprises: a control device obtaining mounting information of an attachment; and the control device using the mounting information to control an apparatus to mount the attachment onto the shell-shaped dental appliance.

In some embodiments, the mounting information may comprise a position and an angle for mounting the attachment onto the shell-shaped dental appliance.

In some embodiments, the method for mounting an attachment on a shell-shaped dental appliance may further comprise: the control device controlling an identification recognizing device to scan the shell-shaped dental appliance to obtain its identification information; and the control device obtaining the mounting information from a database based on the identification information.

In some embodiments, the apparatus may employ one of the following means to mount and fix the attachment onto the shell-shaped dental appliance: adhesion and welding.

In some embodiments, the apparatus may mount and fix the attachment onto the shell-shaped dental appliance by adhesion.

In some embodiments, the attachment may be mounted and fixed onto the shell-shaped dental appliance with an ultraviolet curing adhesive. The method may further comprise: the control device controlling the apparatus to dispense the adhesive onto at least one of mounting areas of the attachment and the shell-shaped dental appliance; and the control device controlling the apparatus to irradiate a beam of ultraviolet on an area where the attachment and the shell-shaped dental appliance engage with each other, to cure the ultraviolet curing adhesive.

In some embodiments, the method may further comprise: the control device using the mounting information to control the apparatus to align the attachment and the shell-shaped dental appliance, wherein the attachment is kept stationary during the aligning.

In some embodiment, the shell-shaped dental appliance may be a one-piece shell which forms a cavity for receiving teeth.

In some embodiments, the shell-shaped dental appliance may be frabricated using thermoplastic forming technique.

In some embodiments, the cavity of the shell-shaped dental appliance may have a geometry for repositioning the teeth from a first tooth arrangement to a second tooth arrangement.

In another aspect, the present application provides a system for mounting an attachment onto a shell-shaped dental appliance, which comprises: a control device for controlling the system to mount an attachment onto a shell-shaped dental appliance; and at least one manipulator, the control device being configured to: use mounting information to control the at least one manipulator to align the attachment and the shell-shaped dental appliance, to mount and fix the attachment onto the shell-shaped dental appliance.

In some embodiments, the control device may be a computer.

In some embodiments, the mounting information may comprise a position and an angle for mounting the attachment onto the shell-shaped dental appliance.

In some embodiments, the system further comprises an identification recognizing device, and the control device is configured to control the identification recognizing device to recognize the identification of the shell-shaped dental appliance, and then obtain the mounting information from a database according to the identification of the shell-shaped dental appliance.

In some embodiments, the identification recognizing device may be a QR code (Quick Response code) scanning device for scanning QR codes on shell-shaped dental appliances.

In some embodiments, the system may employ one of the following means to mount and fix the attachment onto the shell-shaped dental appliance: adhesion and welding.

In some embodiments, the system may mount and fix the attachment onto the shell-shaped dental appliance by adhesion, and it may further comprise an adhesive dispenser, and the control device is configured to control the adhesive dispenser to dispense adhesive onto at least one of the mounting areas of the attachment and the shell-shaped dental appliance.

In some embodiments, the adhesive dispenser supplies an ultraviolet curing adhesive, the system further comprises an ultraviolet light source, and the control device is configured to: after the dispensing of the adhesive and the aligning of the attachment and the shell-shaped dental appliance, control the ultraviolet light source to irradiate a beam of ultraviolet to the area where the attachment is mounted onto the shell-shaped dental appliance, to cure the ultraviolet curing adhesive.

In some embodiment, the shell-shaped dental appliance may be a one-piece shell which forms a cavity for receiving teeth.

In some embodiment, the shell-shaped dental appliance may be fabricated using thermoplastic forming technique.

In some embodiment, the cavity of the shell-shaped dental appliance may have a geometry for repositioning the teeth from a first tooth arrangement to a second tooth arrangement.

BRIEF DESCRIPTION OF THE DRAWINGS

The above and other features of the present application will be further illustrated below with reference to figures and their detailed description. It should be appreciated that these figures only show several exemplary embodiments according to the present application, so they should not be construed as limiting the protection scope of the present application. Unless otherwise specified, the figures are not necessarily drawn to scale, and similar reference numbers therein denote similar components.

DETAILED DESCRIPTION OF ILLUSTRATED EMBODIMENTS

In the following detailed description, reference is made to the accompanying drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

One aspect of the present application provides a shell-shaped dental appliance attachment mounting system and method to automate mounting and fixation of attachments onto shell-shaped dental appliances, thereby liberating man power and improving efficiency and mounting quality.

A shell-shaped dental appliance is a one-piece shell and forms a cavity for receiving teeth. In one embodiment, a shell-shaped dental appliance may be obtained by forming a polymeric sheet material on a positive model of teeth using thermoplastic forming technique. In one embodiment, the cavity of a shell-shaped dental appliance may have a geometry for repositioning teeth from a first tooth arrangement to a second tooth arrangement.

Figure 1:
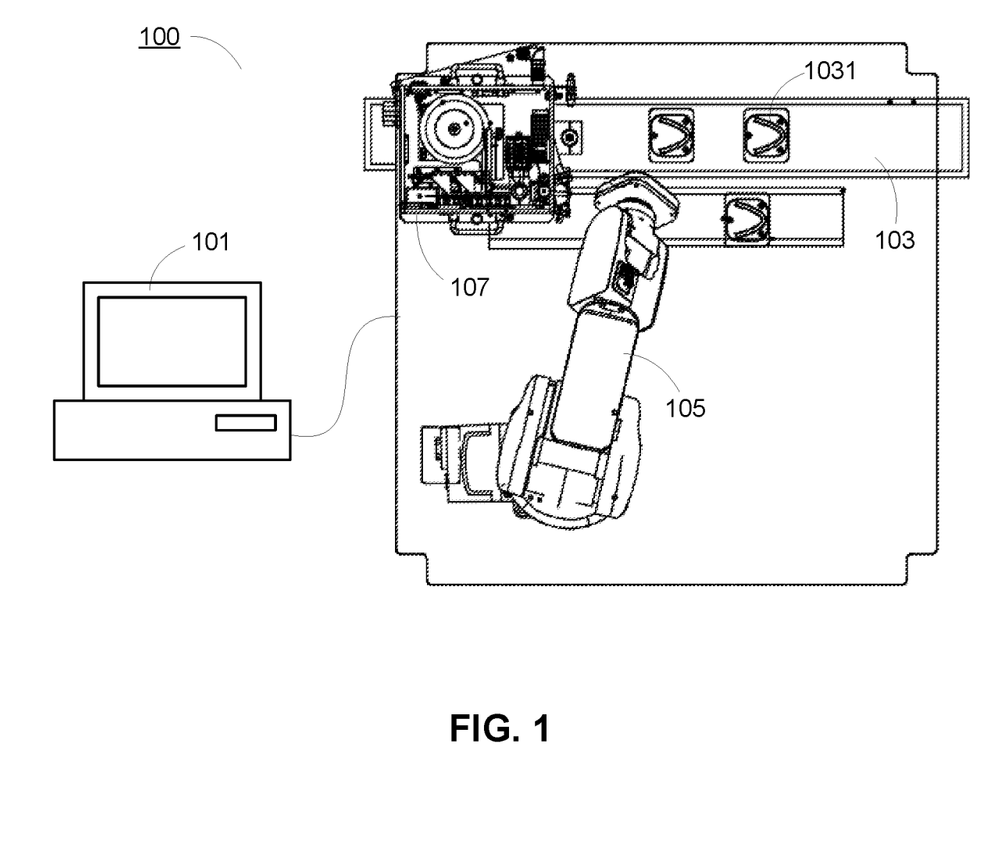
FIG. 1 schematically illustrates a shell-shaped dental appliance attachment mounting system in an embodiment of the present application.

Referring to FIG. 1, it schematically illustrates a shell-shaped dental appliance attachment mounting system 100 in an embodiment of the present application.

The shell-shaped dental appliance attachment mounting system 100 comprises a control device 101, a conveyor belt 103, a manipulator 105 and an attachment mounting module 107.

The control device 101 is to control the shell-shaped dental appliance attachment mounting system 100 to mount and fix attachment onto shell-shaped dental appliances. In one embodiment, the control device 101 may be any suitable computer, e.g., a personal computer, a server, a smart mobile phone, and a single-chip computer etc. In another embodiment, the control device 101 may be a control device with an Application Specific Integrated Circuit (ASIC), a Field Programmable Gate Array (FPGA), a microcontroller unit (MCU) or a Digital Signal Processor (DSP), etc. as a core.

The conveyor belt 103 is to convey shell-shaped dental appliances 1031 to a station where they are to be mounted with attachments. The manipulator 105 is to fetch a shell-shaped dental appliance from the conveyor belt 103, and transport it to a specific position for attachment mounting and fixing. The attachment mounting module 107 is to cooperate with the manipulator 105 to align a attachment and a shell-shaped dental appliance, to fix and mount the attachment onto the shell-shaped dental appliance held by the manipulator 105.

Figure 2:
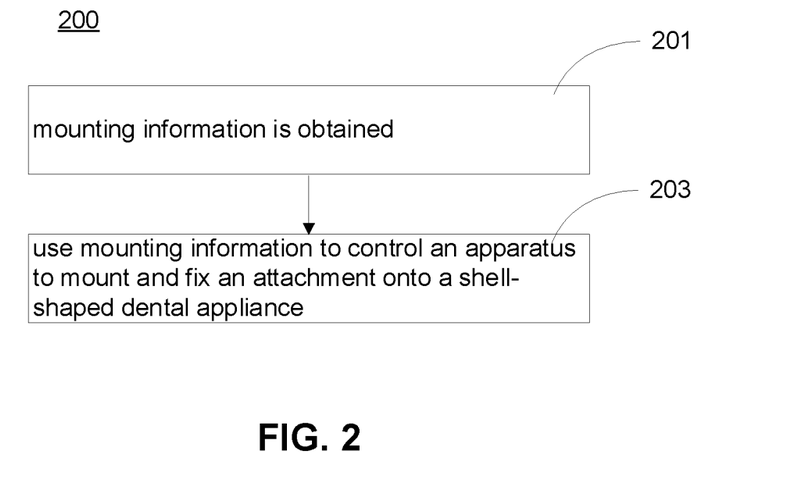
FIG. 2 illustrates a schematic flow chart of a shell-shaped dental appliance attachment mounting method in an embodiment of the present application.

Referring to FIG. 2, it illustrates a schematic flow chart of a shell-shaped dental appliance attachment mounting method 200 in an embodiment of the present application. The shell-shaped dental appliance attachment mounting method 200 will be illustrated in conjunction with the automated shell-shaped dental appliance attachment mounting system 100.

In 201, mounting information is obtained.

In one embodiment, the control device 101 may control the conveyor belt 103 to run and stop in a predetermined rhythm to mount attachments onto shell-shaped dental appliances that arrive the attachment mounting station in turn. Inspired by the present application, it is understood that there are many other options for feeding shell-shaped dental appliances, it shall not be limited to conveyor belt.

In one embodiment, when a shell-shaped dental appliance which is to be mounted with an attachment arrives the attachment mounting station, the control device 101 may control an identification recognizing device (not shown in figures) to obtain identification information of the shell-shaped dental appliance, and then obtain the mounting information corresponding to the shell-shaped dental appliance from a database based on the identification information. In one embodiment, the identification recognizing device may be a QR code scanning device configured to scan QR codes on shell-shaped dental appliances to extract their identification information. Inspired by the present application, it is understood that the identification recognizing device is not limited to QR code scanning device.

In one embodiment, a piece of mounting information may include information of position and direction of the mounting of an attachment onto a shell-shaped dental appliance, e.g., it may include coordinates of the position and the direction of the mounting of the attachment onto the shell-shaped dental appliance.

In 203, the mounting information is used to control the apparatus to mount and fix the attachment onto the shell-shaped dental appliance.

Referring to FIG. 1 again, when a shell-shaped dental appliance which is to be mounted with an attachment arrives the attachment mounting station, the control device 101 may control the conveyor belt 103 to stop, then control the manipulator 105 to fetch the shell-shaped dental appliance and transport it to the attachment mounting module 107 for attachment mounting operation. In the attachment mounting operation, the control device 101 uses the mounting information obtained in 201 to control the manipulator 105 to adjust the position and the orientation of the shell-shaped dental appliance to precisely align the attachment and the shell-shaped dental appliance, thereby ensuring the precision of the mounting of the attachment.

Since almost each shell-shaped dental appliance is different in shape and size, a shell-shaped dental appliance needs to be precisely positioned during attachment mounting. Hence, the manipulator 105 and the shell-shaped dental appliance need to be aligned when the manipulator 105 fetches the shell-shaped dental appliance to achieve correct coordinates (including position coordinates and angular coordinates) conversion, so that the control device 101 can precisely control the manipulator 105 to precisely align the shell-shaped dental appliance and the attachment. In one embodiment, the manipulator 105 may fetch a shell-shaped dental appliance which is not yet demolded, and the manipulator 105 and the shell-shaped dental appliance may be aligned by an aligning structure on the positive model of teeth. In one embodiment, the manipulator 105 may fetch an uncut shell-shaped dental appliance, and the manipulator 105 and the uncut shell-shaped dental appliance may be aligned by an aligning structure formed on a part of the uncut shell-shaped dental appliance which part is to be trimmed off. It can be understood that so long as the shell-shaped dental appliance can be aligned with the manipulator 105, the mounting information and known relative positional relationship between various components can be used to control the apparatus to precisely mount the attachment, specific details thereof will not be presented further here.

Figure 3:
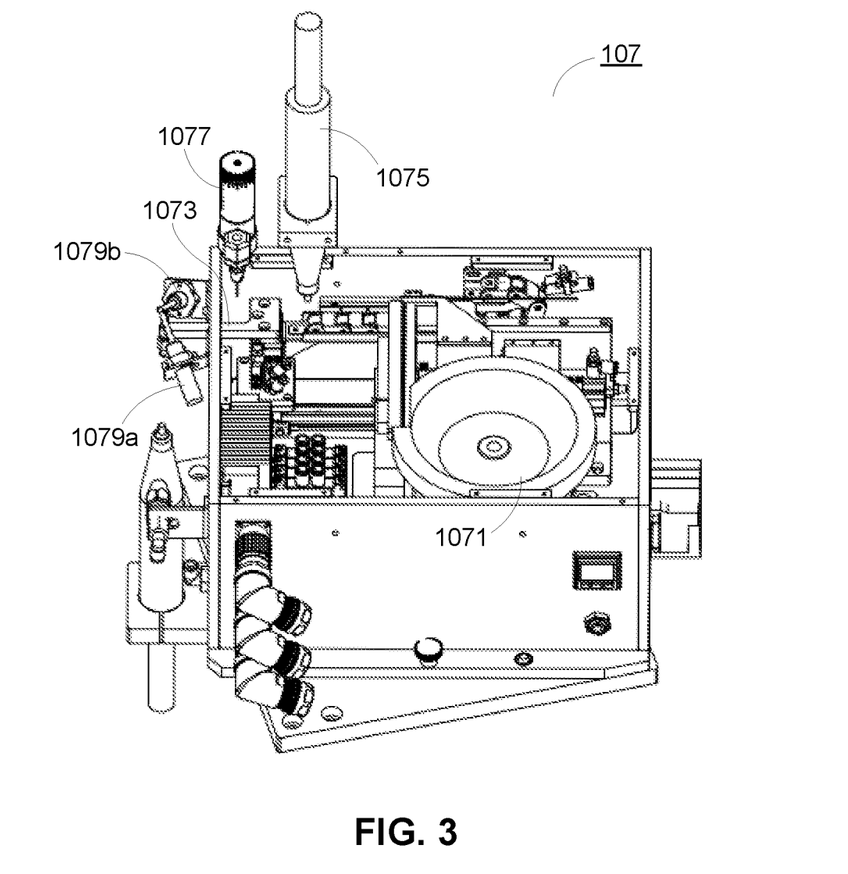
FIG. 3 schematically illustrates the attachment mounting module shown in FIG. 1.

Referring to FIG. 3, it schematically illustrates the attachment mounting module 107 in an embodiment of the present application.

The attachment mounting module 107 comprises a vibratory bowl feeding module 1071, a manipulator 1073, a cleaning device 1075, an adhesive dispenser 1077, and curing light sources 1079a and 1079b.

The vibratory bowl feeding module 1071 is to feed attachments. The manipulator 1073 is to transfer attachments between different stations to have them mounted on shell-shaped dental appliances. The cleaning device 1075 is to clean attachments before they are mounted. The adhesive dispenser 1077 is to dispense adhesive onto mounting surfaces of attachments. The curing light sources 1079a and 1079b are to irradiate light beams onto an area where an attachment engages with a shell-shaped dental appliance after the attachment is in mounting position to cure the adhesive quickly.

Figure 4:
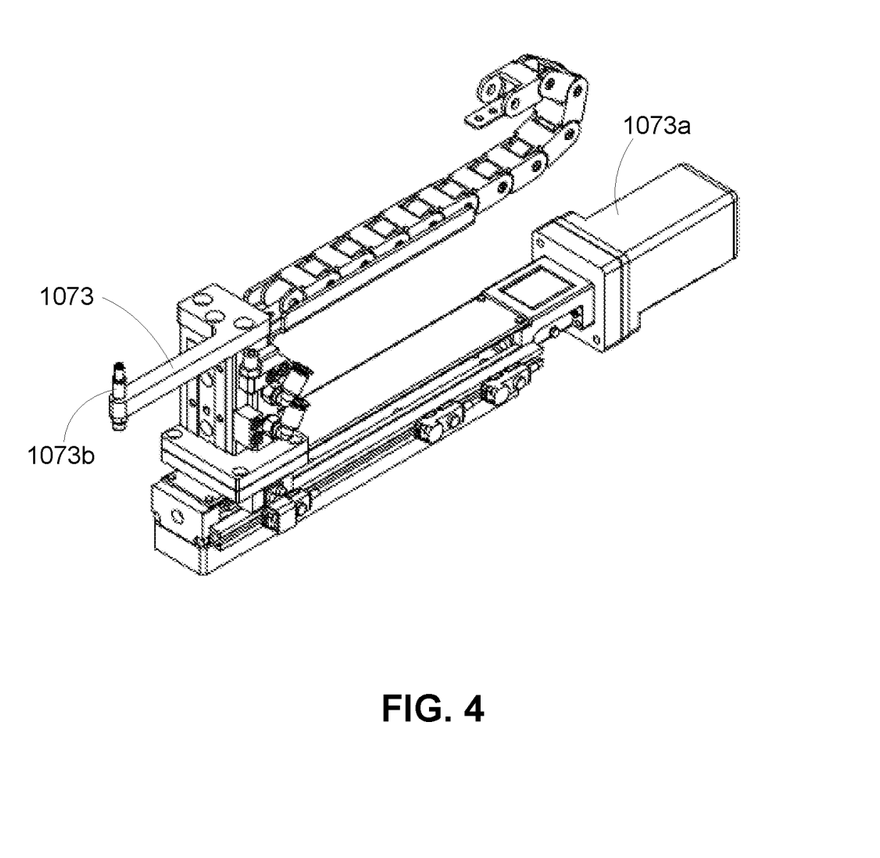
FIG. 4 schematically illustrates the manipulator for holding attachments shown in FIG. 1.

Referring to FIG. 4, it schematically illustrates the manipulator 1073 in an embodiment of the present application.

The manipulator 1073 is driven by a motor 1073a to move along a straight line. A distal end of the manipulator 1073 is formed with an attachment receiving slot 1073b for receiving and positioning an attachment.

Figure 5:
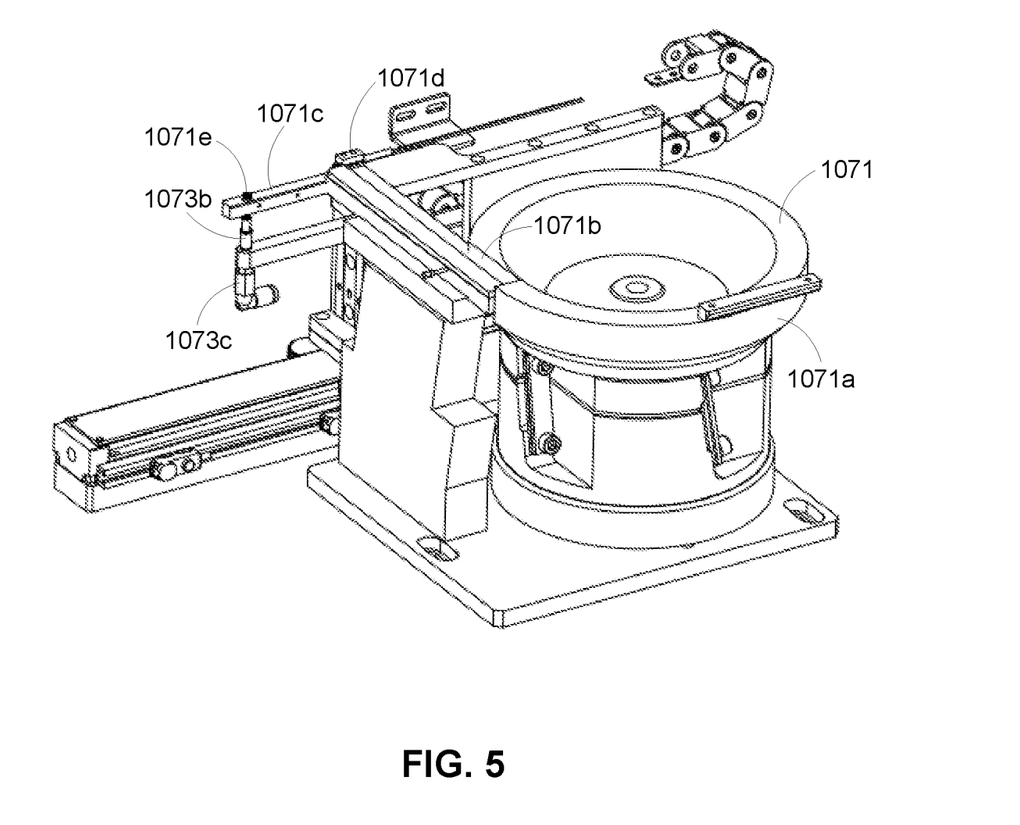
FIG. 5 schematically illustrates how the vibratory bowl feeding module shown in FIG. 1 feeds attachments.

Referring to FIG. 5, it schematically illustrates cooperation between the vibratory bowl feeding module 1071 and the manipulator 1073.

The vibratory bowl feeding module 1071 includes a vibratory bowl 1071a and guide rails 1071b and 1071c, wherein a first end of the guide rail 1071b is connected with the vibratory bowl 1071a, and its second end is connected with the guide rail 1071c to transport attachments from the vibratory bowl 1071a to the guide rail 1071c. It is understood that besides vibratory bowl, attachments may be fed in other ways.

When a sensor (not shown) detects that an attachment is conveyed to the guide rail 1071c, the control device 101 controls a slider 1071d to push the attachment to a through hole 1071e at one end of the guide rail 1071c, so that the attachment falls from the through hole 1071e to the attachment receiving slot 1073b of the manipulator 1073. To enable an attachment to easily fall from the through hole 1071e into the attachment receiving slot 1073b and increase its retention in the attachment receiving slot 1073b, the attachment receiving slot 1073b is connected with an air suction device 1073c, and the attachment is sucked into and held in the attachment receiving slot 1073b by suction of the air suction device 1073c.

In one embodiment, the attachment receiving slot 1073b is detachable. When attachments having a different shape need to be mounted, an attachment receiving slot with a corresponding structure may be installed, thus to widen the application scope of the shell-shaped dental appliance attachment mounting system 100.

Referring to FIG. 3 again, the cleaning device 1075, the adhesive dispenser 1077 and the curing light sources 1079a and 1079b are arranged along a trajectory of the manipulator 1073. After the manipulator 1073 fetches an attachment, the control device 101 controls it to move to the cleaning device 1075, and then controls the cleaning device 1075 to clean the attachment. In one embodiment, the cleaning device 1075 may be a plasma cleaning device, and it is able to clean and activate surface of attachments. It is understood that the cleaning device 1075 may be any other suitable cleaning device.

After an attachment is cleaned, the control device 101 controls the manipulator 1073 to move to the adhesive dispenser 1077, and then controls the adhesive dispenser 1077 to dispense adhesive on the attachment.

After adhesive is dispensed, the control device 101 controls the manipulator 1073 to move to the curing light sources 1079a and 1079b, and controls the manipulator 105 to transport the shell-shaped dental appliance to the curing light sources 1079a and 1079b, to make the attachment abuts against the shell-shaped dental appliance at a position where it is to be mounted. The curing light sources 1079a and 1079b irradiate light beams on the adhesive to cure it so that the attachment is fixed on the shell-shaped dental appliance and thereby the mounting of the attachment is completed.

In one embodiment, while the attachment engages with the shell-shaped dental appliance waiting for cure of the adhesive, a force may be exerted by the manipulator 105 so that the attachment abuts against the shell-shaped dental appliance tightly to ensure a good firm bond.

In one embodiment, an ultraviolet curing adhesive may be employed to bond attachments to shell-shaped dental appliances. The curing light sources 1079a and 1079b may be ultraviolet light sources.

Inspired by the present application, it is understood that many parts in the above embodiment may be modified or replaced.

For example, besides fixation by adhesion, attachments may be mounted and fixed on shell-shaped dental appliances by welding, e.g., ultrasonic welding, laser welding, fusion welding, friction welding, pulse welding and infrared welding.

To align an attachment and a shell-shaped dental appliance, the attachment may be remained stationary, and the manipulator is controlled to move the shell-shaped dental appliance to align with the attachment. In another embodiment, the shell-shaped dental appliance is remained stationary, and the manipulator is controlled to move the attachment to align with the shell-shaped dental appliance. In a further embodiment, the manipulators may be controlled to move both the attachment and the shell-shaped dental appliance to align them with each other.

While various aspects and embodiments have been disclosed herein, other aspects and embodiments will be apparent to those skilled in the art, inspired by the present application. The various aspects and embodiments disclosed herein are for illustration only and are not intended to be limiting, and the scope and spirit of the present application shall be defined by the following claims.

Likewise, the various diagrams may depict exemplary architectures or other configurations of the disclosed methods and systems, which are helpful for understanding the features and functions that can be included in the disclosed methods and systems. The claimed invention is not restricted to the illustrated exemplary architectures or configurations, and desired features can be achieved using a variety of alternative architectures and configurations. Additionally, with regard to flow diagrams, functional descriptions and method claims, the order in which the blocks are presented herein shall not mandate that various embodiments of the functions shall be implemented in the same order unless otherwise the context specifies.

Unless otherwise specifically specified, terms and phrases used herein are generally intended as "open" terms instead of limiting. In some embodiments, use of phrases such as "one or more", "at least" and "but not limited to" should not be construed to imply that the parts of the present application that do not use similar phrases intend to be limiting.

We claim:

1. A system comprising:
    a control device;
    a first manipulator;
    a second manipulator;
    a guide rail;
    an identification recognizing device;
    a feeding module;
    a slider; and
    an adhesive dispenser;
        wherein a first end of the guide rail is connected to the feeding module;
        wherein a second end of the guide rail comprises a through hole;
        wherein the slider is slidably mounted on the guide rail; and
        wherein the control device is configured to:
            control the slider to push an attachment from the first end of the guide rail, when positioned thereon, to the through hole such that the attachment falls from the through hole and is captured and held by the second manipulator;
            control the second manipulator to move away from the through hole;
            control the identification recognizing device to scan a shell-shaped dental appliance to obtain its identification;
            obtain attachment mounting information of the shell-shaped dental appliance from a database based on the identification,
                wherein the attachment mounting information comprises a mounting position of the attachment on the shell-shaped dental appliance and a direction of the attachment on the shell-shaped dental appliance;
            control the adhesive dispenser to dispense adhesive on the attachment held by the second manipulator;
            use the attachment mounting information to control the first manipulator to align and engage the attachment and the shell-shaped dental appliance with each other, thereby to mount the attachment onto the shell-shaped dental appliance,
                wherein the attachment remains stationary when the attachment and the shell-shaped dental appliance are aligned and engaged with each other.

2. The system of claim 1, wherein the control device is a computer.

3. The system of claim 1, wherein the mounting information comprises a position and an angle for mounting the attachment onto the shell-shaped dental appliance.

4. The system of claim 1 further comprising the identification recognizing device, the control device being configured to control the identification recognizing device to recognize the identification of the shell-shaped dental appliance, and then obtain the mounting information from a database according to the identification of the shell-shaped dental appliance.

5. The system of claim 1, wherein the identification recognizing device is a QR code scanning device configured to scan a QR code on the shell-shaped dental appliance.

6. The system of claim 1, wherein the adhesive dispenser supplies an ultraviolet curing adhesive,
    wherein the system further comprises an ultraviolet light source, and
    wherein the control device is configured to control the ultraviolet light source to irradiate an ultraviolet beam onto an area where the attachment is mounted onto the shell-shaped dental appliance to cure the ultraviolet curing adhesive.

7. The system of claim 1, wherein the shell-shaped dental appliance is a one-piece shell defining a cavity for receiving teeth.

8. The system of claim 7, wherein the cavity of the shell-shaped dental appliance has a geometry for repositioning the teeth from a first tooth arrangement to a second tooth arrangement.

9. The system of claim 1, wherein the feeding module is a vibratory bowl feeding module.

10. The system of claim 1, wherein the second manipulator comprises an attachment receiving slot thereon, wherein the attachment receiving slot is connected with an air suction device such that the attachment receiving slot is able to suck and retain the attachment therein.

* * * * *